Figure 1:
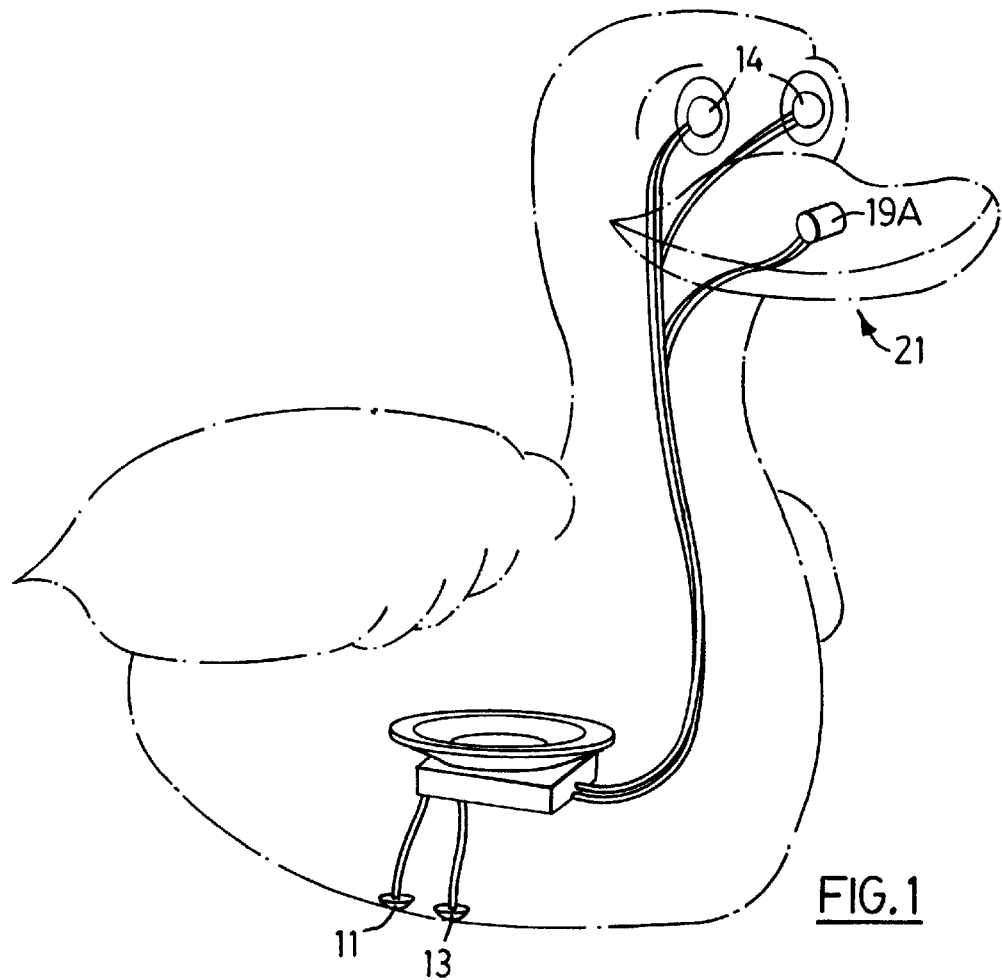

United States Patent [19]

Rodgers

[11] Patent Number: 5,989,091
[45] Date of Patent: Nov. 23, 1999

[54] BATHTUB TOY

[76] Inventor: Nicholas A. Rodgers, c/o Shaw & Co., SJO 892, P.O. Box 025216, Miami, Fla. 33102-5210

[21] Appl. No.: 09/038,153

[22] Filed: Mar. 11, 1998

Related U.S. Application Data

[63] Continuation-in-part of application No. 08/970,097, Nov. 13, 1997, which is a continuation-in-part of application No. 08/508,964, Jul. 28, 1995, Pat. No. 5,697,182.

[51] Int. Cl.[6] ............................. A63H 23/00; A63H 3/28; H01H 29/00
[52] U.S. Cl. .......................... 446/153; 446/175; 446/297; 369/63; 200/184
[58] Field of Search ..................................... 446/153, 156, 446/160, 175, 297; 369/63; 200/182–184, 199–200

[56] References Cited

U.S. PATENT DOCUMENTS

| 4,314,423 | 2/1982 | Lipsitz et al. | 446/153 |
| 4,347,681 | 9/1982 | Fima | 43/17.6 |
| 4,479,329 | 10/1984 | Fraden | 446/175 |
| 5,157,857 | 10/1992 | Livingston | 43/17.6 |
| 5,175,951 | 1/1993 | Fruchey | 43/17.6 |
| 5,267,886 | 12/1993 | Wood et al. | 446/175 |
| 5,299,107 | 3/1994 | Ratcliffe et al. | 362/158 |
| 5,316,515 | 5/1994 | Hyman et al. | 446/28 |
| 5,344,357 | 9/1994 | Lyczek | 446/154 |
| 5,438,320 | 8/1995 | Taylor | 340/573 |
| 5,523,927 | 6/1996 | Gokey | 362/103 |
| 5,611,720 | 3/1997 | Vandermaas | 446/47 |
| 5,672,090 | 9/1997 | Liu | 446/268 |
| 5,683,164 | 11/1997 | Chien | 362/78 |

Primary Examiner—Robert A. Hafer
Assistant Examiner—Laura Fossum
Attorney, Agent, or Firm—Robert L. Westell

[57] ABSTRACT

A bathtub toy has a battery, timing circuit and an audible or visible output. A motion responsive switch closes to connect the battery to the output and start the timing circuit. The timing circuit shuts off the output after an interval until the switch again closes after the interval.

6 Claims, 3 Drawing Sheets

BATHTUB TOY

This is a Continuation-in-Part of application Ser. No. 08/970,097 filed Nov. 7, 1997 pending; which is a Continuation-in-Part of application Ser. No. 08/508,964 filed Jul. 28, 1995, now U.S. Pat. No. 5,697,182.

This invention relates to a novel bathtub toy.

It is known to provide toys to be played with in the bathtub. However a bathtub toy which will provide light or light and sound is not known to me. The toy is provided with an output circuit adapted to provide a light, or a sound, or both, responsive to the off-to-on transition of a motion sensitive switch.

A timing circuit is connected to time an interval responsive to the off-to-on transition when an interval is not already being timed. The timing circuit is arranged to effect a connection between the battery and an output circuit during said interval, and to terminate such connection with the end of said interval. The output circuit is arranged to provide during such interval the visible on audible signal continuously or intermittently or intermittently according to a pattern.

The visible signal is preferably provided by a Light Emitting Diode ('LED') or LEDs. LEDs are thought to be the most efficient light source with the power (about 3 volts) which may be provided from an encapsulated battery.

The audible signal is preferably provided by a speaker.

Figure 4:
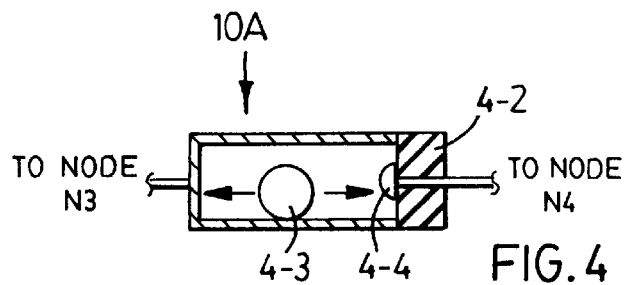
Figure 5:
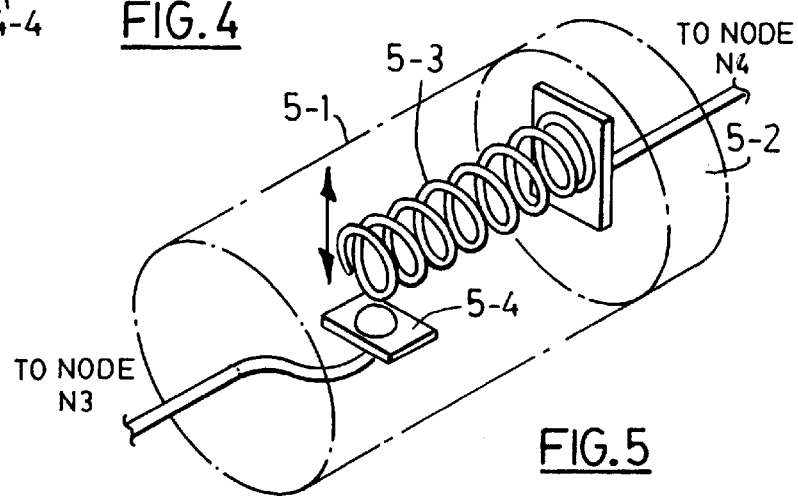
Figure 2:
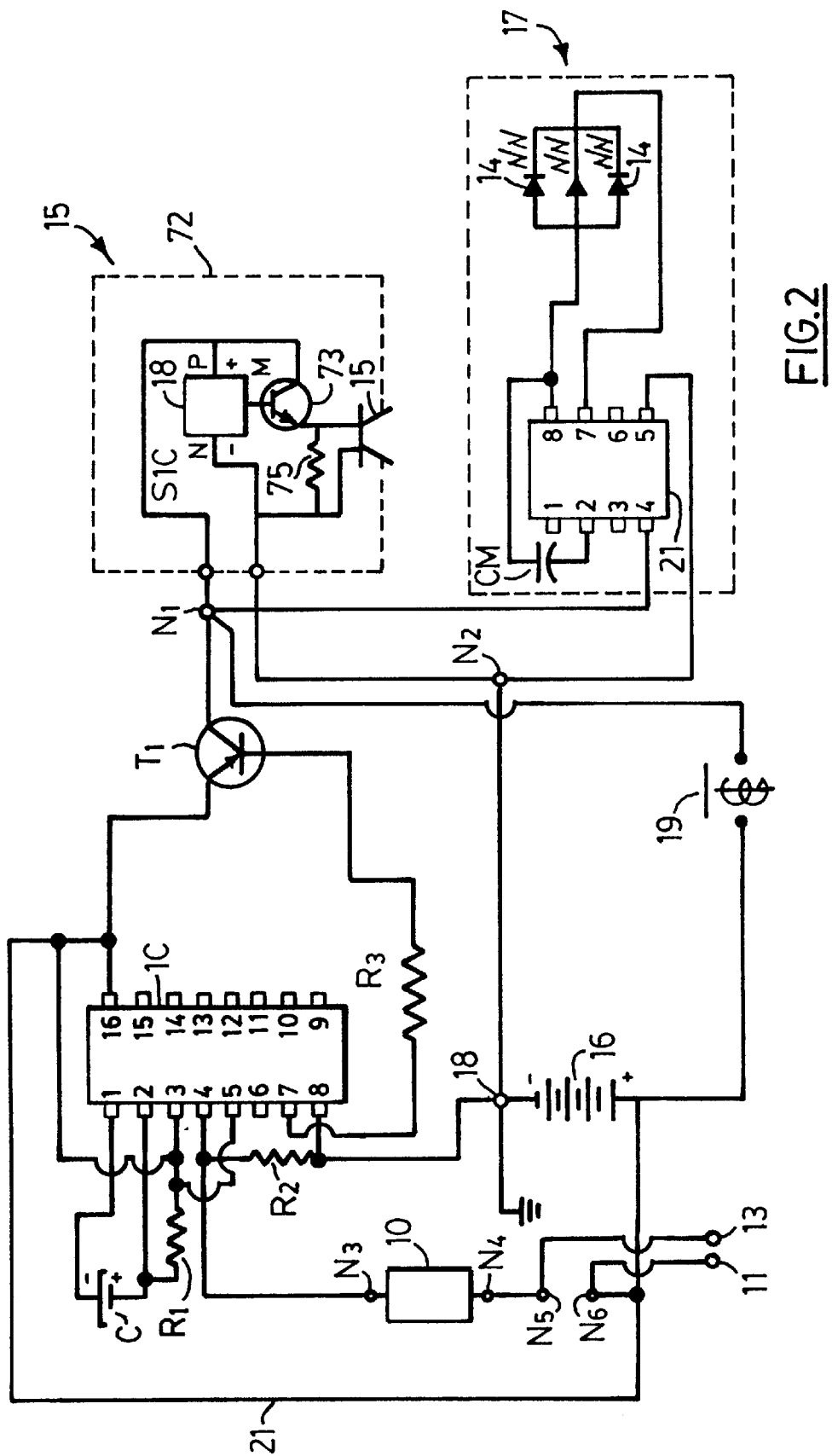
Figure 3:
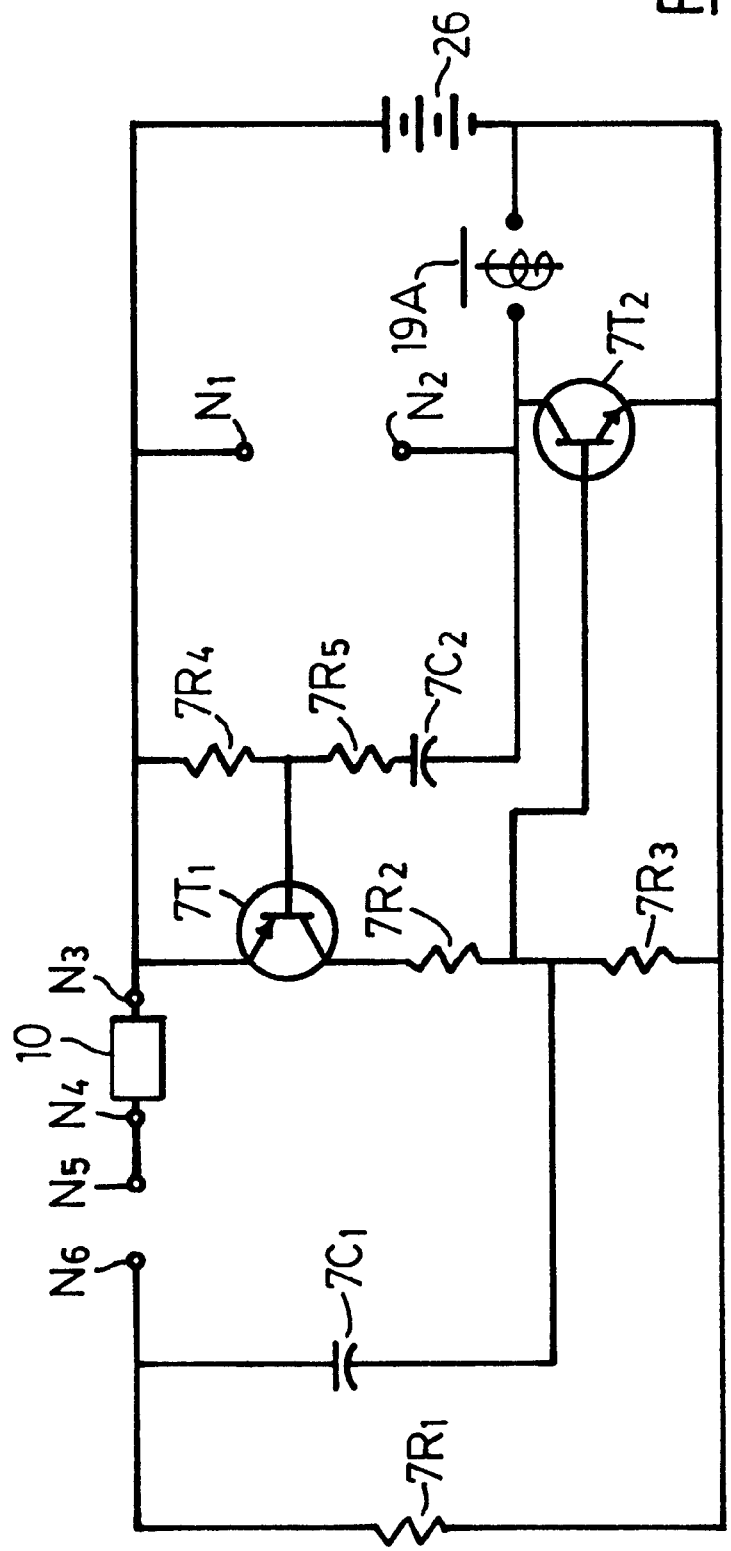

In drawings which illustrate a preferred embodiment of the invention:

FIG. 1 illustrates an example of the toy,
FIG. 2 is a circuit to be contained in the toy,
FIG. 3 is an alternate circuit to be contained in the toy,
FIG. 4 is a motion responsive switch,
FIG. 5 is an alternate motion responsive switch.

In the drawings a bathtub toy—here a duck (although it might be any bathtub-suitable toy) is provided with LEDs 14 or other lights for actuation in accord with intervals initiated by a motion responsive switch 10 (FIG. 2,3,4,5,) and a control module including a timing circuit shown in detail in FIG. 2. An alternate form a control module is shown in FIG. 3. Somewhere about the body of the toy it is preferred to provide a normally open pressure sensitive switch 19A which, when used, allows the battery to energize the light and/or sound sources independently of the control module.

Thus the pressure sensitive switch 19A will be located in a suitable place which will depend upon the shape used. With the duck shown herein it is preferred to put the pressure sensitive switch in the beak 21. The body and beak of the bird may be rubber as discussed. If the body made of plastic or other material the beak surface must be made flexible enough that the pressure switch therein may be digitally actuated. With another pressure switch location, the body must also be arranged to allow actuation of the pressure switch.

It is usually desirable for a bathtub toy to be buoyant so that this may be made a feature of the toy's body. Thus a buoyancy chamber may be added if desired. The toy may be of rubber, plastic or other suitable material. It may be shaped to portray any bird, animal or a boat, for example.

In FIG. 2 there is shown a control module and components combined therewith. Battery 16, positive is connected over nodes N6 and N5 respectively connected to water probes 11 and 13 in series with a motion responsive switch 10 to integrated circuit IC terminal 4. Battery 16 positive is also connected over line 21 to IC terminal 16, and the emitter of transisting T1. Transistor T1 acts as a power switch and when closed under control of the integrated circuit, connects battery power to the output circuit over node N1. The output circuit, in the preferred embodiment, comprises the sound module 15 and the light module 17.

Battery 16 positive is also connectable to node N1 over normally open pressure sensitive switch 19.

Battery negative is connected to instrument ground at node 18. Node 18 is connected to R2, IC terminal 8 and to node N2.

The integrated circuit, C, R1, R2, and R3 are connected, as shown.

The motion responsive switch 10 connects Nodes N3 and N4 and may be a mercury switch which is well known. Other motion responsive switches may be used.

Alternatives to the mercury switch include the ball switch 10A shown in FIG. 4. The node N3 may be connected to a conducting cylinder. The other end of the cylinder is plugged with insulation 4-2. A connection from node N4 is connected through insulator 4-2 to a conducting knob 4—4. A conducting ball 4-3 can roll freely in the cylinders. The switch is closed between nodes N3 and N4 when the ball 4-3 is in contact with knob 4—4. Otherwise it is open.

A third alternative motion responsive switch is shown in FIG. 5 where a conducting cylinder 5-1 has an open end, closed by an insulator 5-2. A conductor to node N4 extends through the insulation to mount the fixed end of a flexible (conducting) stem helical spring 5-3. The free end of the stem may then vibrate and will sometimes contact the knob 5-4 which is connected to node N3. The switch is closed when spring 5-3 contacts knob 5-4, and otherwise open.

The three switches described are all reversible between nodes N3 and N4.

There are many types of output circuits which may be connected across nodes N1 and N2. The one described has a sound module and a light module connected in parallel. Obviously the output may be solely light or solely sound.

The sound module 72 uses a sound synthesizer integrated circuit ('SIC' or 'chip') 18. I prefer to use that manufactured by Motorola under number MC68HC05KG.

The positive lead from node N1 is connected to the positive terminal P of SIC 18 and the negative lead from node N2 is connected to negative SIC terminal N. When power is applied across terminals P and N a modulated output from terminal M is applied to the base of transistor amplifier 73. (For the transistor amplifier I prefer to use model 9012. The amplified output is applied to the speaker 15 to produce the sound. The synthesizer will give a choice of sounds some of which can be appropriate to the kind of animal portrayed. The resistance 75 is connected in parallel with the speaker 15 and typically has the value 303 K . Other sound synthesizers with their own characteristic connections are within the scope of the invention. Thus any toy in accord with the invention may have a light module alone, a sound module alone or both as here.

The light, here LED's 14 may be directly connected across nodes N1 and N2, in which case they would be on for the duration of the timed interval. However it may be preferred to have them flash during the timed interval under control of the oscillator chip 21. This preferably comprises a National Semiconductor Chip Number 3909 connected as shown in FIG. 2 as an oscillator. The basic multi-vibrator circuit of oscillator 21 is modified by the higher capacity capacitor CM to produce a larger power interval which, (or example, night be two seconds. Node N1 is connected to chip 21 battery terminal 4 and Node N2 is connected to the battery terminal 5.

When power appears at N1 due to closure of the switch T1 or the pressure switch 19, a quartz crystal in chip 21 vibrates to cause power to be applied periodically (as selected) to the chip input terminals 8 and 7. The rate of vibration can be varied by changing the value of capacitor CM connected between terminals 2 and 8 of chip 21.

FIG. 2 shows 3 LED's connected in parallel. The number of LED's could be greater or smaller.

FIG. 2 shows circuitry including an integrated circuit IC used to time the activation of the sound module 15 and the light module. Over the timing interval these modules may be connected to be on continuously or intermittently. As shown in FIG. 2 the sound module is on for the interval and the light module flashes during the interval. The integrated circuit IC, transistor T1, battery and switch 10 are preferably encapsulated.

Preferred values for the circuit elements of FIG. 2 are as follows.

IC—INTEGRATED CIRCUIT 3RR8503 MC 1-528
    T—TRANSISTOR 32N3906
    C—CAPACITOR 0.47 µF at 3.0 V
    16—BATTERY 3 V
    12—LIGHT SOURCE (LED)
    10—ACTIVATION SWITCH (MERCURY) (ALTERNATIVELY MECHANICAL OR PIEZOTRONIC)
    R1—RESISTOR 1 MEGOHM 1/8 w
    P2—RESISTOR 1 MEGOHM 1/8 w
    R3—RESISTOR 1 MEGOHM 1/8 w

The switch 10 may be replaced by any other suitable motion responsive switch such as the flexible stem switch of FIG. 5 or the ball switch of FIG. 4.

(The integrated circuit and transistor referred to immediately above are both available from Motorola Canada Limited, 3125 Steeles Avenue East, North York, Ontario, Canada).

Water probes 11 and 13 are connected to nodes N5 and N6 and thus form a switch in series with switch 10, with the water probe switch being open when the probes are out of the water and closed when they are in.

The water probes 11 and 13 each present exposed metal to the surface of the body so that water may form a conductor between them when the probes are immersed. The remainder of the circuitry shown may be encapsulated or permanently insulated.

The sound module 15 and light module 17 are connected across nodes N1 and N2 as shown. A normally open pressure sensitive switch 19 is connected from battery 16 positive to node N1.

With either switch 10 open or water probe switch open (the latter because the probes are not in the water), and switch 19 open, the circuit will be quiescent.

Capacity C will be charged to the value of battery 16 (here 3 V). Pin 4 of the integrated circuit will be held at 0 volts which is the voltage arbitrarily designated at node 18. The integrated circuit IC will be in reset condition having the effect that there will be a positive voltage at pin 7, rendering the transistor T1 non-conducting and switch 19 is open so that the sound nor the light modules are off.

With probes 11, 13 are in the water, movement of the toy causes switch 10 to complete the circuit between battery 16 positive and IC pin 4. (Thus the switch 10 has completed an off-to-on transition). Battery 16 connection to IC pin 4 causes a (0–1) or 0V to 3V transition at pin 4 which causes the integrated circuit IC to go to "set" condition causing pin 7 of IC to go to 0 volts. This causes transistor T1 to conduct activating the light and sound circuits 15 and 17. The set condition of IC connects pin 3 with node 18 and in a time determined by C and R1 the circuit is returned to reset condition, deactivating the light and sound circuits and allowing C to recharge. The circuitry is further designed so that switch 10 must be turned off and on again before the integrated circuit IC can again be activated to 'set' state.

It will be appreciated that the 'ground' shown at node 18 is instrument ground only and is unconnected to anything outside the toy. The choice of node 18 is somewhat arbitrary but assists in the description of the circuit.

If it is desired to actuate the light and sound circuit independently of the motion switch or the water probe switch, then the pressure sensitive switch 19 may be closed. The light and sound system will then be operated for the duration of closure of the switch 19.

FIG. 3 shows a timing and control module which is alternative to that shown in FIG. 2.

In FIG. 3 the integrated circuit IC is replaced by discrete elements. A schematic distribution of these elements in the toy is not shown but it will be realized that they are placed as found convenient in the toy body while the lights will be located as shown in FIG. 1 as described.

Moreover the water probes 11 and 13 are not shown but it will be understood that these are exposed to the surface of the body and will be connected to nodes N5 and N6 respectively in FIG. 3. The light and sound systems are not shown but these will be connected between nodes N1 and N2 in FIG. 3. Water probes 11 and 13 are exposed to the water when the body is immersed.

Exemplary only values of the circuit elements of FIG. 3 are indicated below.

7 R1—1 MEGOHM
    7 R2—1 KILOHM
    7 R3—100 KILOHM
    7 R4—1 KILOHM
    7 R5—1 KILOHM
    7 C1—0.1 µf
    7 C2—10 µf
    7 T1—2N3906 PNP
    7 T2—2N3905 NPN
    23—ILLUMINATION CIRCUIT
    10—MOTION RESPONSIVE SWITCH

FIG. 3 shows a simple one shot circuit.

When motion responsive switch 10 is closed providing an of-to-on transition state, it applies positive voltage to 7C1 and the base of 7T2. This will cause 7T2 to conduct. This, in turn, supplies battery power to the light and sound circuit connected across nodes N1 and N2.

7T2 conducting also connects the negative side of 7C2 to the negative side of the battery. This will place the base of 7T1 at a potential less positive than its emitter which will cause it to conduct. 7T1 supplies positive voltage to the voltage divider 7R2 and 7R3 which supplies positive voltage to the base of 7T2. This will hold 7T2 on after 7C1 has charged and no longer conducts current to the base of T2.

The RC network formed by the resistors 7R4, 7R5 and 7C2 determines the length of time the LEDs will be on. When 7C2 charges, the potential on the base of 7T1 becomes less negative and 7T1 will cease to conduct. This, in turn removes the positive bias from the base of 7T2 (which acts as the power switch analogous to T1 of FIGS. 1A, 1B) which switch 7T2 will turn off terminating the power interval and the flow of power to the illumination circuit.

To repeat the cycle, switch 10 must be opened and then reclosed (the latter out side a power interval) to initiate the timing of a new power interval.

Thus if for any reason switch 10 remains closed the LEDs will be extinguished by the circuit described above after the interval illumination duration provided by the RC network.

The circuit of FIG. 3 is provided with water-sensitive probes 11 and 13 between nodes N5 and N6 as described in connection with FIG. 2. Switch 10 between nodes N4 and N5 may be replaced by any suitable motion responsive switch.

If the user of the toy desires to operate the light and sound system independently of the timing circuit then he may press the normally open pressure sensitive switch 19 which connects the light and sound system directly across the battery 26.

It cannot be said that the circuit of FIG. 3 is always preferable over that of FIG. 2 or vice versa. The circuitry of FIG. 3 is somewhat simpler. However, the circuitry of FIG. 2 may be made extremely compact. The integrated circuit of FIG. 8 may take advantages of a process called 'on board integrated circuitry'. In this process the integrated circuit, IC, is actually, built into a (very small) circuit board and covered with a dot of epoxy. The size of the integrated circuit of FIG. 2 is about 3/16 inch in diameter and only 1/32 of an inch thick.

With either timing circuit a light module alone or a sound module alone, may be sued. Moreover the light module may be of one or more LED's and may be on continuously or may flash. Similar variation in the sound module. In the case of either the sound or the light module, the circuit must be such as to be operable by the voltage available and without rapidly dissipating the battery.

I claim:
1. Bathtub toy comprising:
   a body,
   components in said body comprising:
      a battery,
      a motion responsive switch contained therein, adapted to provide off-to-on and on-to-off transitions,
      a timing circuit arranged for timing an interval upon occurrence of such an off-to-on transition when no interval is being timed,
      an output circuit adapted to provide an audible or visible output during battery connection,
      said timing circuit being arranged to connect said battery and said output circuit for the duration of said interval,
      said toy including spaced conducting probes exposed to the surface of said body arranged to prevent such timing in the absence of water between said probes.
2. Bathtub toy as claimed in claim 1 wherein said output is continuous over said interval.
3. Bathtub toy as claimed in claim 1 wherein said output is intermittent over said interval.
4. Bathtub toy as claimed in claim 1 including a pressure sensitive normally open switch arranged when closed to connect said battery to output circuit, independently of said timing circuit.
5. Bathtub toy as claimed in claim 4 wherein said output is continuous over s aid interval.
6. Bathtub toy as claimed in claim 4 wherein said output is intermittent over said interval.

* * * * *